United States Patent [19]
Gauci et al.

[11] Patent Number: 5,775,750
[45] Date of Patent: Jul. 7, 1998

[54] ROBOTIC COLLISION DETECTION BUMPER

[75] Inventors: Noel J. Gauci, Rochester Hills; Paul T. Prange, Royal Oak, both of Mich.

[73] Assignee: ABB Flexible Automation Inc., New Berlin, Wis.

[21] Appl. No.: 666,856

[22] Filed: Jun. 19, 1996

[51] Int. Cl.$^6$ ................................................ B60R 19/00
[52] U.S. Cl. ............................ 293/2; 293/4; 180/274; 901/49
[58] Field of Search ........................ 293/2, 4, 154, 293/135; 180/274, 275, 277, 279; 901/1, 49

[56] References Cited

U.S. PATENT DOCUMENTS

| | | | |
|---|---|---|---|
| 1,686,536 | 10/1928 | Schauman | 293/4 X |
| 2,920,713 | 1/1960 | Paradise | 293/4 X |
| 3,307,867 | 3/1967 | McGovern | 293/135 X |
| 3,499,661 | 3/1970 | Rowe, Jr. | 293/135 X |
| 3,663,048 | 5/1972 | Zimmerle | 293/135 |
| 3,840,259 | 10/1974 | Barenyi | 293/135 X |
| 4,396,814 | 8/1983 | Miller | |
| 4,546,840 | 10/1985 | Yukishige et al. | 293/2 X |
| 4,596,412 | 6/1986 | Everett et al. | 293/4 |
| 4,951,985 | 8/1990 | Pong et al. | 293/2 X |
| 5,230,543 | 7/1993 | Douglas et al. | 293/2 |

FOREIGN PATENT DOCUMENTS

| | | | |
|---|---|---|---|
| 1273397 | 9/1961 | France | 293/4 |
| 2512407 | 3/1983 | France | 293/2 |
| 836126 | 6/1960 | United Kingdom | 293/4 |

*Primary Examiner*—Joseph D. Pape
*Attorney, Agent, or Firm*—Harness, Dickey & Pierce, P.L.C.

[57] ABSTRACT

In accordance with the teachings of the present invention, a robot bumper device coupled to a mobile robot for immobilizing the robot when a predetermined external force is sensed and a robotic bumper system for controlling at least one mobile robot located within an assembly area is provided. The robot bumper device includes at least one constant force spring member having a first portion attached to an outer surface of a mobile robot for providing constant absorption of an external force resulting from a collision between the bumper device and an unsuspecting object. A pressure sensitive electronic switch is mounted to a first surface of a substantially planar plastic member that extends across a predetermined length of the mobile robot. A second portion, opposite the first portion, of the at least one constant force spring member is mounted to a second surface of the plastic member such that the at least one constant force spring member is compressed when the external force resulting from a collision is exerted against the pressure sensitive electronic switch. The switch closes and generates an electric signal for controlling movements of the mobile robot.

18 Claims, 5 Drawing Sheets

ROBOTIC COLLISION DETECTION BUMPER

BACKGROUND OF THE INVENTION

1. Technical Field

This invention relates to bumper devices, and more particularly, to collision detection devices for mobile robotic systems.

2. Discussion

The use of bumper systems in conjunction with mobile automated machinery for detecting collisions with unsuspecting objects is generally known in the art. A typical bumper system commonly includes a bumper structure rigidly affixed to a section of mobile automated machinery and may include hardware components such as electronic switch mechanisms. The electronic switch mechanisms are often coupled to the bumper structure such that they are actuated in response to forces exceeding a threshold level resulting from a collision between the bumper structure and an object. The electronic switch mechanisms may in turn be connected to a motor powering the machinery and/or breaking devices for halting the movements of the machinery.

Unfortunately, upon colliding with an object, the mobile machinery may not be adequately braked, and due to the rigidity of the bumper structure, the forces generated during the collision may not be adequately attenuated or absorbed by the bumper structure in order to avoid damage to the machinery and/or the object.

Prior bumper systems used in conjunction with mobile automated machinery have commonly employed pneumatic ribbon type switches for controlling movements of the machinery. However, an inherent problem with the use of this type of switch in environments requiring minimal breaking distances for the machinery is the existence of "pneumatic lag" which may not be acceptable in such working environments.

It is therefore desirable to provide a collision detecting bumper device for use with a mobile system that electronically immobilizes a given movable element upon sensing an external force from a collision with a foreign object and concurrently attenuates or absorbs the external force so as to minimize damage to the element and/or the foreign object.

More particularly, it is desirable to provide a robot bumper device including constant force spring members, coupled between a mobile robot and a pressure sensitive electronic switch, for providing constant absorption of forces resulting from a collision with a foreign object through a predetermined displacement length of the constant force spring members.

It is further desirable to provide a robot bumper device that includes constant force spring members configured as compressible loop members for coupling the pressure sensitive electronic switch to the mobile robot.

SUMMARY OF THE INVENTION

In accordance with the teachings of the present invention, a bumper device coupled to a mobile robot for immobilizing the robot when a predetermined external force is sensed and a robotic bumper system for controlling at least one mobile robot located within an assembly area are disclosed.

In accordance with the teachings of one embodiment of the present invention, a bumper device coupled to a mobile robot for altering control of the robot when a predetermined external force is sensed includes at least one constant force spring member coupled to an outer surface of the mobile robot for providing constant absorption of an external force resulting from a collision of a contact surface of the bumper device with a foreign object. A pressure sensitive electronic switch is mounted to the contact surface of the constant force spring member and occupies at least a portion of the contact surface. The constant force spring member is compressed when an external force from a collision is exerted against the pressure sensitive electronic switch. In response to exerted pressure, the electronic switch generates an electronic signal for controlling movements of the mobile robot.

In accordance with a preferred embodiment, the constant force spring member includes at least one compressible loop member having a first portion attached to the outer surface of the mobile robot and a second portion, opposite the first portion, coupled to the electronic switch. The at least one compressible loop member includes first and second lengths of elastic material both having a first surface and a second surface. A first end portion of the first surface of the first length of elastic material is coupled to the outer surface of the mobile robot and a second end portion of the first surface of the first length of elastic material is coupled to the electronic switch. Likewise, the second length of elastic material is positioned opposite to the first length of elastic material with a first end portion of the first surface of the second length of elastic material coupled to the outer surface of the mobile robot. A second end of the first surface of the second length of elastic material is coupled to the electronic switch.

BRIEF DESCRIPTION OF THE DRAWINGS

The various advantages of the present invention will become apparent to those skilled in the art after reading the following specifications and by reference to the drawings in which.

DETAILED DESCRIPTION OF THE PREFERRED EMBODIMENTS

The following description of the preferred embodiments is merely exemplary in nature and is in no way intended to limit the invention or its application or uses.

The present invention is particularly concerned with providing collision detecting and force absorbing bumper devices for mobile robots employed in a work area wherein foreign objects and/or personnel may be inadvertently located when the robots are mobile. A plurality of the robot bumper devices will be described in conjunction with mobile robots employed in a paint cell area of a vehicular assembly line. However, the present invention is not limited to such an application and may be used in conjunction with other types of automated mobile machinery which may have foreign objects and/or personnel located in its travel path.

Figure 1:
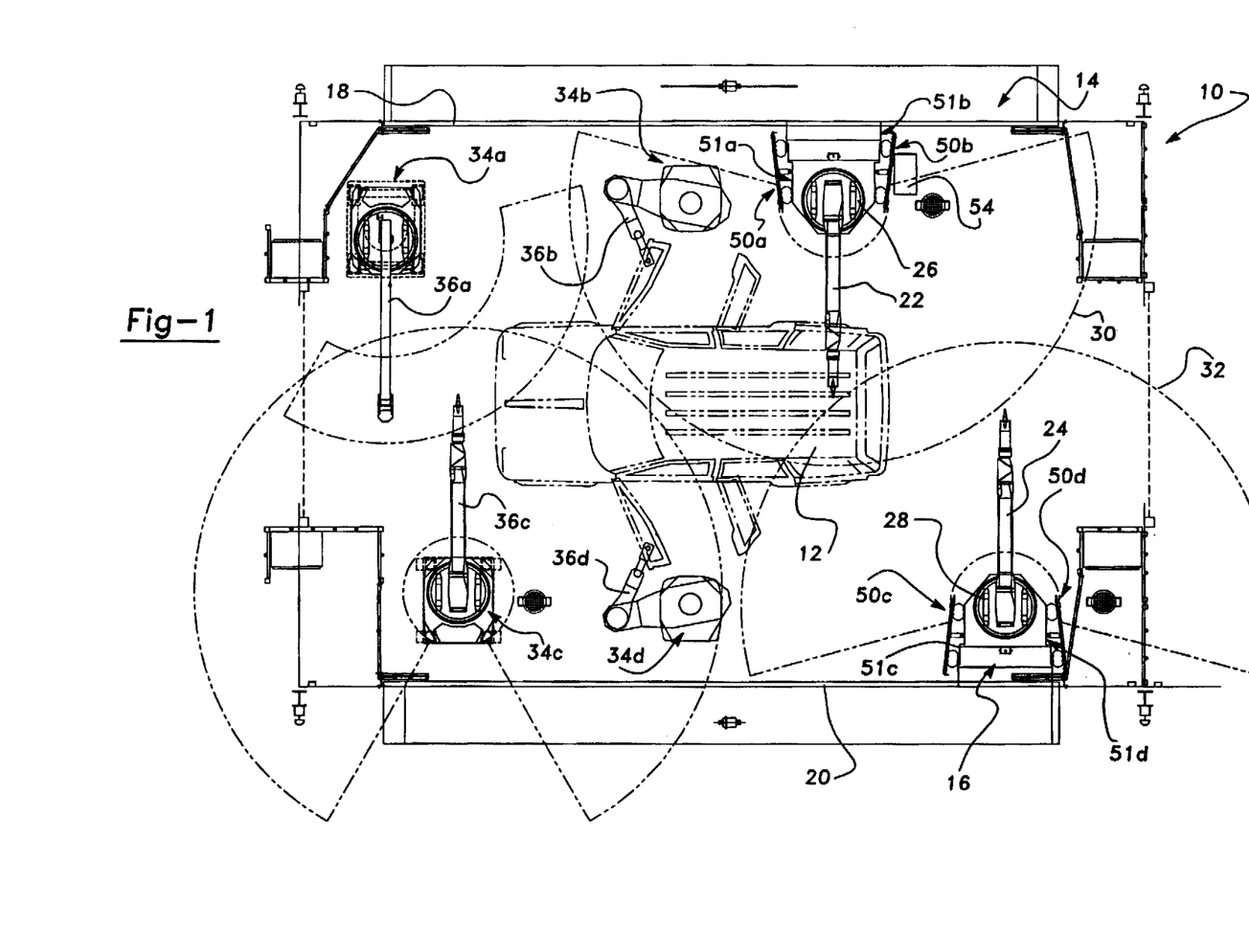
FIG. 1 is a plan view of a paint cell area of a vehicular assembly line including mobile robots employing the robot bumper devices in accordance with the teachings of the present invention.

Referring to FIG. 1, a paint cell area 10 which is part of an assembly line for assembling a vehicle 12 is illustrated. The paint cell 10 includes two mobile robots 14 and 16 which travel parallel to the vehicle 12 during the painting process along walls 18 and 20. Each of the robots 14 and 16 include retractable arm members 22 and 24 which rotate about center portions 26 and 28. Examples of the paths traversed by the mobile robots 14 and 16 as well as the arms 22 and 24 are illustrated by dashed lines 30 and 32. The paint cell 10 also includes stationary robots 34a through 34d which include mobile arm members 36a through 36d. The mobile robots 14 and 16 are configured such that they travel along walls 18 and 20 without contacting or obstructing the stationary robots 34a through 34d.

The mobile robots 14 and 16 include bumper devices 50a through 50d which are mounted to outer surfaces 51a through 51d of the robots 14 and 16. Each of the outer surfaces 51a through 51d face the directions traversed by the mobile robots 14 and 16 during the painting process. The bumper devices 50a through 50d are provided for sensing collisions with objects, such as foreign object 54, that may inadvertently be located in a path traversed by the robots 14 or 16. Additionally, the bumper devices are also provided for absorbing the resulting forces from any such collisions. Typically, the robots 14 and 16 travel at a velocity of approximately four feet per second. As such, by minimizing the mass of the bumper devices 50a-50d, the resulting forces will likewise be minimized for the given velocity of the robot 14.

As will be discussed in detail below, the bumper devices 50a through 50d are configured such that upon impact with a foreign object, an electrical signal is generated for immobilizing either or both of the robots 14 and 16 as well as any of the stationary robots 34a-34d. It should be noted that additional bumper devices may be attached to the arms 22 and 24 of the mobile robots 14 and 16 or the arms 36a-36d of the stationary robots 34a-34d for detecting collisions and for attenuating the resulting forces from such collisions.

Figure 2:
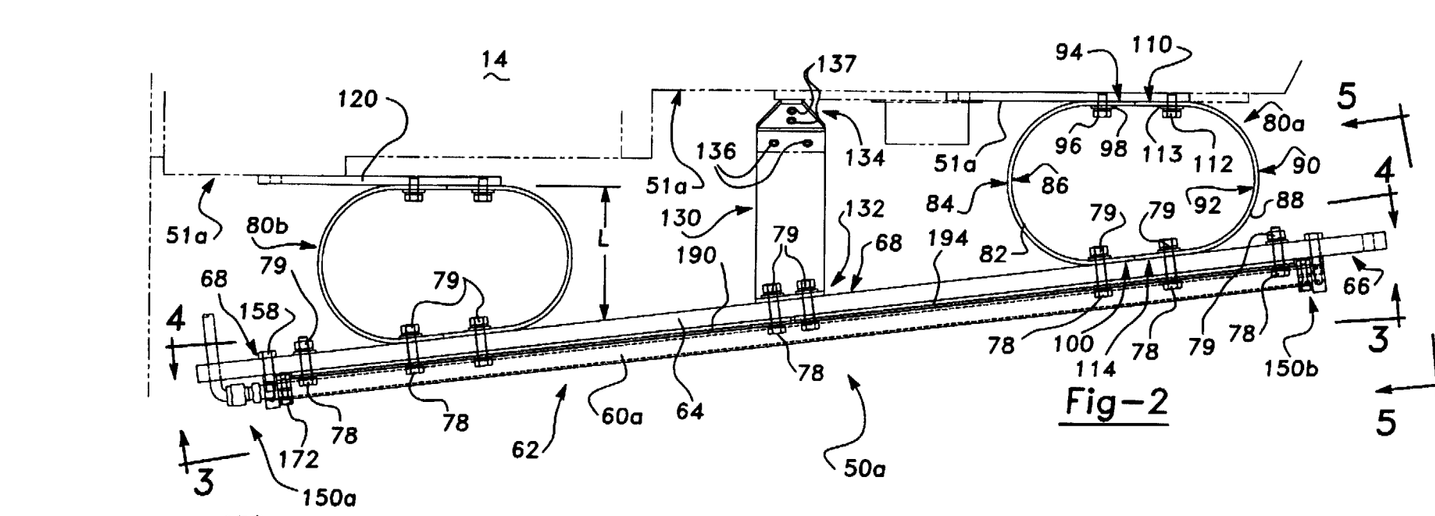
FIG. 2 is a cut away top view of a robot bumper device secured to an outer surface of a mobile robot in accordance with the teachings of the present invention.

Turning to FIG. 2, a cut away top view of the bumper device 50a is illustrated. The present invention will be described with reference to the operation and components of the bumper device 50a, and it will be understood that the other bumper devices 50b through 50d include corresponding components and operate in a similar manner. The bumper device 50a includes a pressure sensitive electronic switch 60a which extends along a portion of the outer surface 51a of the robot 14. The pressure sensitive electronic switch 60d is of a type described in U.S. Pat. No. 4,396,814 to Miller, which is hereby incorporated by reference. Generally, the switch 60a is of a strip-like design which includes internal metallic strips which are enclosed by a compressible structure. The metallic strips are normally open circuited but come in contact with one another to complete an electrical circuit when an external force is applied to a surface 62. As will be discussed in detail below, the completion of the electrical circuit may be used to immobilize the robot 14 or any of the other robots in the cell 10 in response thereto. It should be noted that the present invention is not limited to the use of strip-like switches and that other types of pressure sensitive or proximity switches may be used with the bumper device 50a.

Figure 3:
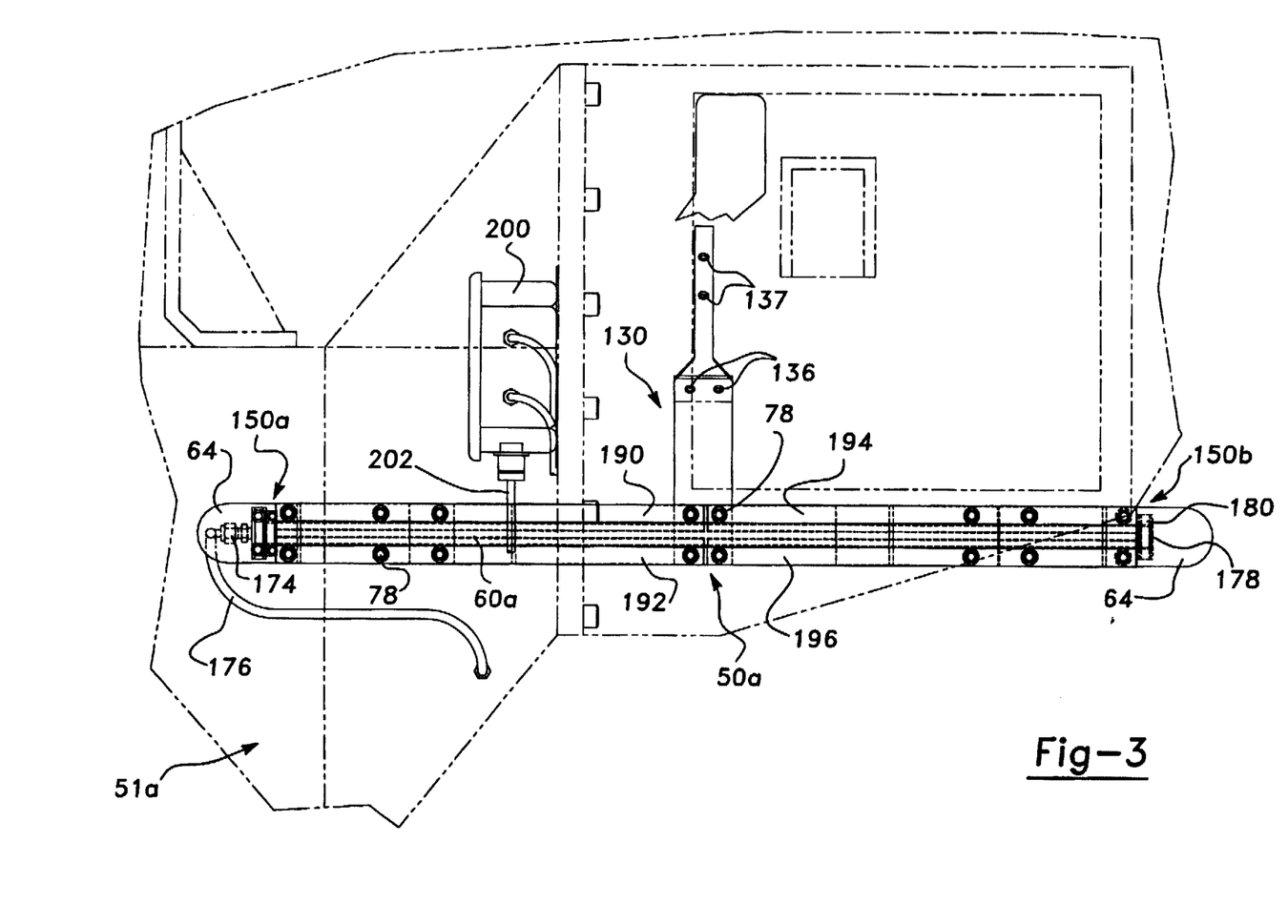
FIG. 3 is a view, along line 3—3 of FIG. 2, of the robot bumper device secured to the outer surface of the mobile robot device in accordance with the present invention.

The electronic switch 60a is mounted to a substantially planar plastic member 64 having a first surface 66 and a second surface 68. The plastic member 64 includes a plurality of apertures formed therein for receiving a like number of screws 78 and nuts 79 for mounting the electronic switch 60a to the first surface 66. As best illustrated in FIG. 3, bar clamp members 190,192, 194 and 196 are interposed between the switch 60a and the first surface 66 of the plastic member 64 for securing the switch 60a thereto. The plastic member 64 is made from a length of nylon type plastic material in order to reduce the overall weight of the bumper device 50a, but the member 64 may also be made from EPDM, aluminum, or other lightweight materials.

Returning to FIG. 2, the bumper device 50a further includes a pair of constant force spring members 80a and 80b which are configured as compressible loop members. The spring members 80a an 80b include common components and will be described in detail with reference to the components of spring member 80a. In order to form the compressible loop, the constant force spring member 80a includes a first length of elastic material 82 having a first surface 84 and a second opposite surface 86. Similarly, the constant force spring member 80a includes a second length of elastic material 88 having a first surface 90 and a second opposite surface 92. A first end portion 94 of the first surface 84 of the first length of elastic material 82 is coupled to the outer surface 51a of the mobile robot 14 with a screw 96 and a washer 98. A second end portion 100 of the first surface 84 of the first length of elastic material 82 is coupled to the second surface 68 of the plastic member 64 with one of the screws 78 and nuts 79. The second length of elastic material 88 is positioned opposite to the first length of elastic material 82 with a first end portion 110 of the first surface 90 coupled to the outer surface 51a of the robot 14 with a screw member 112 and a washer 113. A second end portion 114 of the first surface 90 of the second length of elastic material 88 is coupled to the second surface 68 of the plastic member 64 with another one of the screws 78 and nuts 79 to complete the compressible loop configuration. Alternatively, the constant force spring members 80a and 80b may be formed as continuous loop members. Preferably, the spring members 80a and 80b are formed from nylon type plastic material in order to reduce the mass of the bumper device 50a, but it will be understood that the spring members 80a and 80b may be formed from other lightweight elastic materials having sufficient strength characteristics.

The constant force spring member 80b is likewise coupled between the second surface 68 of the plastic member 64 and a bracket member 120 which, in turn, is coupled to the outer surface of 51a of the robot 14.

As best seen in FIG. 3, the bumper member 50a is also supported in a vertical direction, substantially perpendicular to the major length of the switch 60a, by a vertical support member 130 which has a first end 132 coupled to the second surface 68 of the plastic member 64 with two of the screws 78 and nuts 79. The vertical support member also includes a second end 134 attached to the first end 132 with screws 136 and is coupled to the outer surface 51a of the robot 14 at a height above the plastic member 64 with screws 137.

The bumper device 50a may include additional compressible loop members configured similar to spring members 80a and 80b and which may be located within and/or outside the circumferences of the spring member 80a and 80b. Additionally, the number of spring members for a given bumper device is determined by the overall length of the bumper device, i.e. the number of required spring members increases as the length of the bumper device increases.

In operation, if the bumper device 50a collides with a foreign object, anywhere along the surface 62 of the electronic switch 60a, the constant force spring members 80a and 80b will compress so as to provide constant absorption of the external force generated from the collision throughout a displacement length L (FIG. 2) of the spring members 80a and 80b which is determined by the particular mass and velocity of the robot 14. Preferably, the displacement length L is approximately three inches and the spring members 80a and 80b have a negligible K factor (lbs./in). Concurrently, the electronic switch 60a will close and generate an electric signal in response if the external force exceeds a threshold level of the switch 60a. Preferably, this threshold level is approximately four pounds per square inch (PSI). As will be discussed in detail below, this electronic signal can be used to immobilize or otherwise control the robot 14 and/or any of the other robots 16 and 34a–34d located within the paint cell 10.

The paint cell 10 is a working environment in which various liquids, gases or particulates such as solvents, paints and/or water as well as other potentially damaging substances are commonly used that may damage the robots 14,16 and/or 34a–34d. As such, it is important that the operation of the bumper devices 50a–50d be protected from such foreign substances. Again with reference to bumper device 50a, in order to insulate the switch 60a, a pair of end cap assemblies 150a and 150b are provided at its opposite ends.

Figure 6:
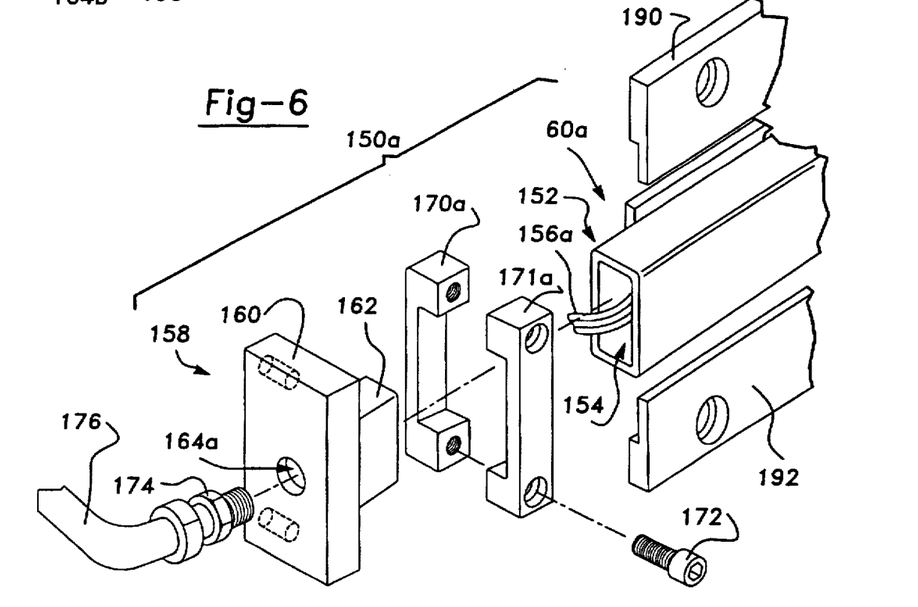
FIG. 6 is an exploded perspective view of an end cap assembly for environmentally sealing an end of a pressure sensitive electronic switch of the robot bumper device in accordance with the present invention.

Turning to FIG. 6, an exploded perspective view of the end cap assembly 150a is illustrated. A first end 152 of the switch 60a includes an opening 154 through which a plurality of conductive leads 156a extend outwardly. When the switch 60a senses an external force exceeding the threshold level of approximately four PSI, the switch 60a closes and the leads 156 provide the electronic signal to a remote location for controlling the robot 14.

In order to environmentally seal the opening 154, the end cap assembly 150a includes an end cap member 158 having a substantially rectangular main portion 160 and a protrusion portion 162 extending outwardly therefrom. The protrusion 162 is configured such that it fits tightly within the opening 154. An aperture 164a extends through the main portion 160 and the protrusion portion 162 of the end cap member 158 for providing access to the conductive leads 156a that extend therethrough. When assembled, the end cap member 158 is inserted within the opening 154 and a pair of clamping members 170a and 171a are coupled to one another by screw members 172, of which only one is shown in this figure, about opposite sides of the switch 60a. The clamping members 170a and 171 a are positioned and tightened such that the protrusion is secured and the opening 154 is sealed from foreign substances. This view also illustrates the bar clamp members 190 and 192 that are partially disposed within recesses in the switch 60a.

A hollow compression fitting member 174 is secured within the aperture 164a of the end cap assembly 150a and coupled to a plastic sleeve member 176. The leads 158a extend through the compression fitting member 174 and the sleeve member 176 such that they are not exposed to the working environment in the cell 10.

Turning to FIG. 3, a view along line 3—3 of FIG. 2 is shown. As illustrated, the sleeve member 176 extends from the bumper device 50a through the outer surface 51a of the robot 14 to a junction box 200. The junction box 200 is configured such that it can receive electronic signals from both of the bumper devices 50a and 50b. Exiting the junction box 200 is a cable 202 which is routed to a remote control circuit which will be discussed in detail below. From this view, it can be seen that additional bumper devices may be mounted above and/or below bumper device 50a so as to provide additional collision detection capability by forming a two dimensional array of bumper devices.

Figure 4:
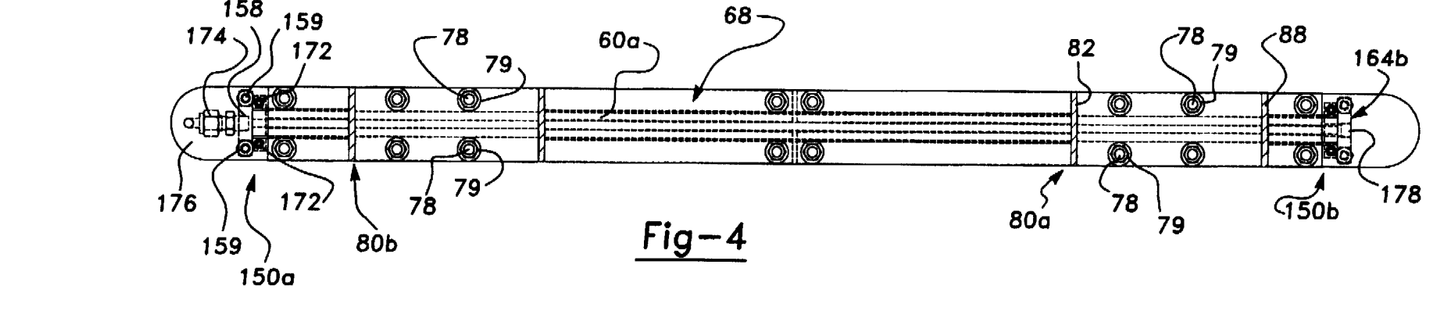
FIG. 4 is a view, along line 4—4 of FIG. 2, of the robot bumper device in accordance with the present invention.

With reference to FIG. 4, a view along line 4—4 of FIG. 2 is shown. Additional bolts 78 and nuts 79 are illustrated securing the constant spring members 80a and 80b to the second surface 68 of the plastic member 64. Both of the screw members 172 are shown securing the clamping members 170a and 171b about the switch 60a. Also shown are screws 159 which secure the end cap member 158 to the second surface 68 of plastic member 64.

Figure 5:
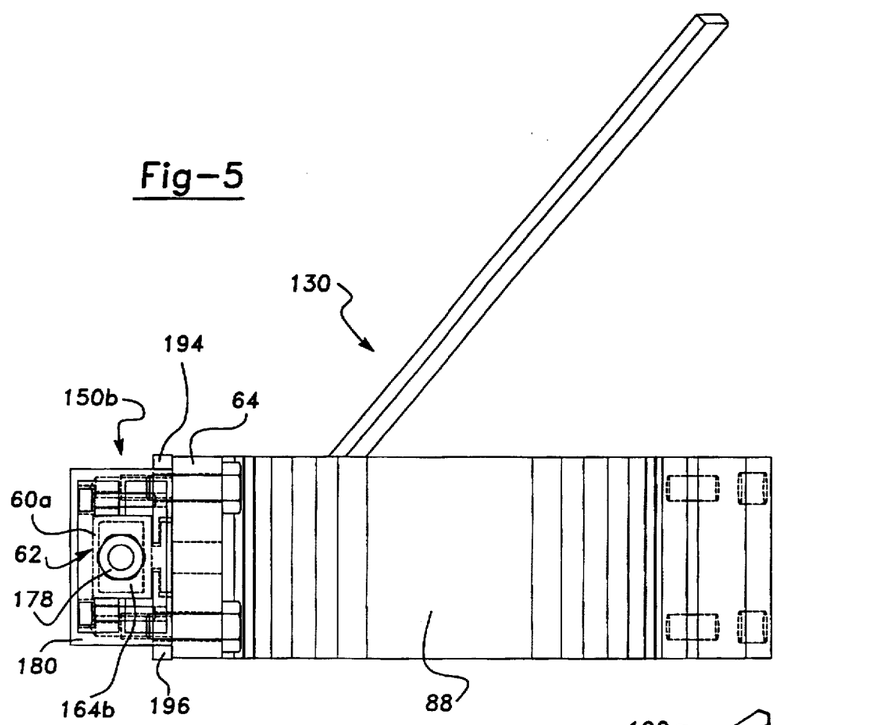
FIG. 5 is a view, along line 5—5 of FIG. 2, of the robot bumper device in accordance with the present invention.

Referring to FIG. 5, the end cap assembly 150b is illustrated and includes elements corresponding to assembly 150a with the exception of a threaded plug member 178 that is secured within an aperture 164b in the end cap member 180. Also illustrated in this view are the bar clamp members 194 and 196 securing the switch member 60a to the plastic bar member 64. Preferably, the threaded plug member 178, the compression fitting 174, and the sleeve member 176 are all formed from a nylon type plastic material in order to reduce the weight of the bumper device 50a.

Figure 7:
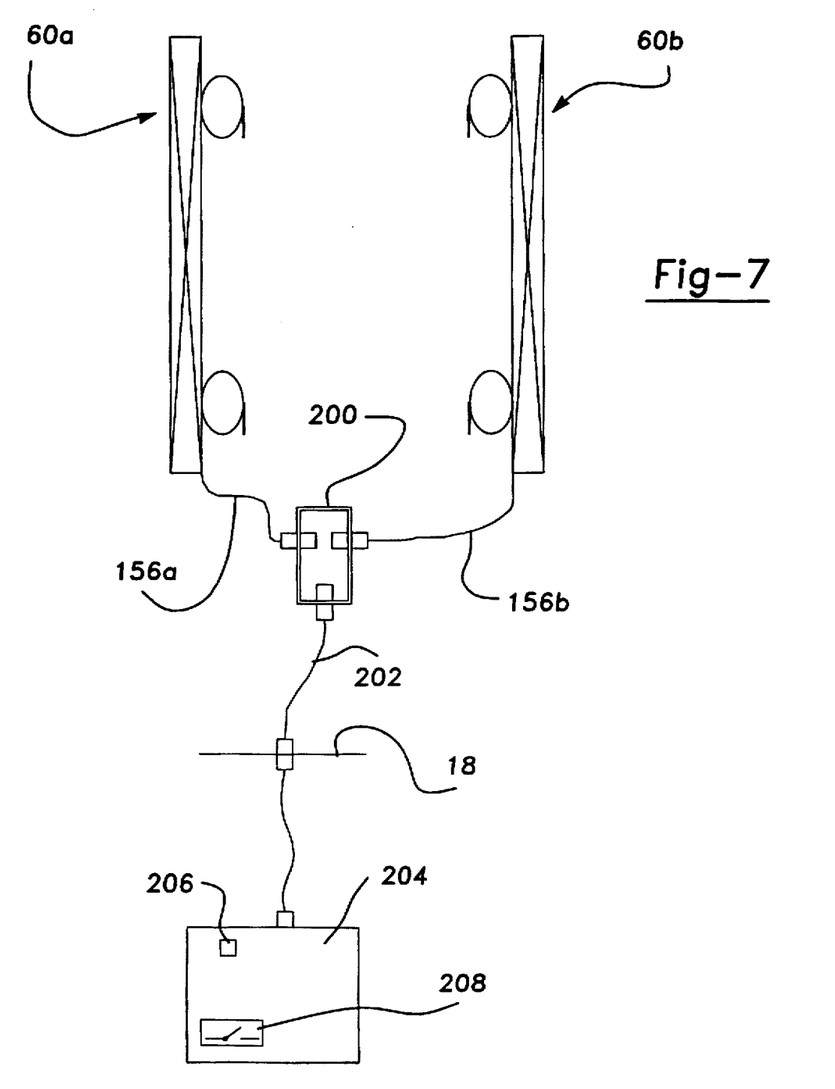
FIG. 7 is a schematic illustration of a robotic bumper system including two robot bumper devices in conjunction with an electronic controller in accordance with the present invention.

Referring to FIG. 7, a schematic diagram of the bumper devices 50a and 50b coupled to an electronic controller device 204 as part of a robotic bumper system for robot 14 is shown. As schematically illustrated, the pressure sensitive electronic switch 60a of bumper device 50a includes a conductive lead 156a which terminates at the junction box 200. Similarly, a pressure sensitive electronic switch 60b of the bumper device 50b includes a conductive lead 156b which also terminates at junction box 200. The lead 202 exiting the junction box 200 extends through the outer wall 18 of the paint cell 10 and is coupled to the electronic controller device 204. The electronic controller device includes a zener diode barrier illustrated by box 206 and a electrical relay circuit 208.

In operation, if either of the pressure sensitive electronic switches 60a or 60b detect an external force exceeding a threshold level due to the robot 14 colliding with a foreign object, such as foreign object 54 within the cell 10, one of the switches will close and an electronic signal will be sent via leads 156a or 156b to the junction box 200. This signal is then routed via lead 202 to the electronic controller 204.

Upon sensing that either of the switches 60a or 60b have changed state from open to closed, the electronic controller 204 will cause the electronic relay 208 to change state in order to immobilize or otherwise control the mobile robots 14 and/or 16 as well as the stationary robots 34a through 34d. The relay 208 may be coupled to braking devices and/or the servomotors of any or all of the robots in the cell 10. As such, any damage to the foreign object 54 will be minimized. The zener diode barrier 206 electrically isolates the electronic controller 204 from the paint cell 10 in order to control the operating voltages within the cell 10 as well as to attenuate or eliminate noise signals which may cause the controller 204 to inadvertently immobilize the robot 14.

From the foregoing, it can be seen that compared to prior rigid bumper systems, the robot bumper device of the present invention minimizes any damage which may occur as a result of a collision between the robots and foreign objects by providing constant absorption of the resulting forces and by concurrently electronically immobilizing the robots. An additional advantage of the present invention is that the bumper device of the present invention is lightweight and is insulated from potentially damaging substances which may be employed in its work area which, in turn, will ultimately extend the life of the robot bumper device.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. A robot bumper device coupled to a mobile robot for altering control of the robot when a predetermined external force is sensed, comprising:
    a pair of compressible loop members each having a first portion attached to an outer surface of the mobile robot facing a path traveled by the robot;
    an electronic switch associated with at least a portion of the outer surface of the mobile robot; and
    a plastic member having a first surface and a second surface, the electronic switch being mounted to the first surface of the plastic member, second portions of the pair of compressible loop members being attached to the second surface of the plastic member, whereby when the external force is exerted against the electronic switch, the loop members are compressed and provide constant absorption of the external force and the electronic switch generates an electric signal in response to the external force, the electronic switch being able to generate the electric signal independently of the loop members being compressed.

2. The robot bumper device of claim 1, wherein each of the compressible loop members includes:
    a first length of elastic material having a first surface and a second surface;
    a second length of elastic material having a first surface and a second surface;
    a first end portion of the first surface of the first length of elastic material being coupled to the outer surface of the mobile robot, a second end portion of the first surface of the first length of elastic material being coupled to the a second surface of the plastic member; and
    the second length of elastic material being positioned opposite to the first length of elastic material with a first end portion of the first surface of the second length of elastic material being coupled to the outer surface of the mobile robot and a second end of the first surface of the second length of elastic material being coupled to the second surface of the plastic member.

3. The robot bumper device of claim 1, further comprising:
    electronic controller means operable for altering control of the robot in response to the electronic signal generated by the electronic switch and wherein the electronic switch comprises a normally open pressure sensitive switch that closes in response to the application of the external force thereto and generates the electronic signal in response thereto.

4. A robotic bumper system for controlling at least two mobile robots located within an assembly area, comprising:
    at least two robot bumper devices coupled to the at least two mobile robots for altering control of the at least two robots when a predetermined external force is sensed by any one of the at least two robot bumper devices, each of the at least two robot bumper devices including:
    (a) constant force spring means, coupled to an outer surface of one of the at least two mobile robots facing a path traversed by the robot, for providing constant absorption of the external force throughout a predetermined displacement length of the constant force spring means;
    (b) a pressure sensitive electronic switch extending across a predetermined length of the mobile robot; and
    (c) mounting means for mounting the pressure sensitive electronic switch to the constant force spring means, whereby the constant force spring means is compressed when the external force is exerted against the pressure sensitive electronic switch and the pressure sensitive electronic switch concurrently generates an electronic signal, and the electronic switch being able to generate the electronic signal independently of the constant force spring means being compressed.

5. The robotic bumper system of claim 4, wherein the constant force spring means includes at least one compressible loop member having a first portion attached to the outer surface of the mobile robot and a second portion, opposite the first portion, coupled to the mounting means.

6. The robotic bumper system of claim 4, wherein the constant force spring means includes:
    a first length of elastic material having a first surface and a second surface;
    a second length of elastic material having a first surface and a second surface;
    a first end portion of the first surface of the first length of elastic material being coupled to the outer surface of the mobile robot, a second end portion of the first surface of the first length of elastic material being coupled to the mounting means; and
    the second length of elastic material being positioned opposite to the first length of elastic material with a first end portion of the first surface of the second length of elastic material being coupled to the outer surface of the mobile robot and a second end of the first surface of the second length of elastic material being coupled to the mounting means.

7. The robotic bumper system of claim 4, wherein each of the at least two robot bumper devices further includes:
    a pair end cap assemblies for sealing openings in opposite ends of the pressure sensitive electronic switch from liquid infiltration, each of the end cap assemblies including:
    (a) an end cap member having a main portion and a protrusion extending therefrom, the protrusion being insertable within an opening in one of the ends of the pressure sensitive electronic switch the end cap member having an aperture extending through the protrusion and the main portion;
    (b) a pair of clamping members coupled to one another about opposite sides of the electronic switch corresponding to the location of the protrusion therein for sealing the end of the pressure sensitive electronic switch, whereby conductive leads extending from one of the ends of the pressure sensitive electronic switch extend through the aperture in the cap member for external access thereto; a threaded plug member located within the aperture of a first of the pair of end cap members for sealing the aperture; and
    (c) a hollow compression fitting member coupled to a sleeve member, the compression fitting member being secured within the aperture of a second of the pair of end cap members with the leads of the pressure sensitive switch extending through the compression fitting member and the sleeve member.

8. The robotic bumper system of claim 4, further comprising:

electronic controller means operable for immobilizing the at least two robots located within the assembly area in response to one of the electronic signals generated by the pressure sensitive electronic switches of the at least two robots.

9. The robotic bumper system of claim 8, further comprising:

electrical junction means for coupling the electronic signals generated by the pressure sensitive electronic switches of the at least two robots located within the assembly area to the electronic controller means.

10. A bumper device coupled to a mobile element for altering control of the mobile element when a predetermined external force is sensed, comprising:

a constant force spring element, coupled to an outer surface of the mobile element, for providing constant absorption of the external force;

an electronic switch associated with at least a portion of the outer surface of the mobile element and generating an electronic signal in response to the external force;

the electronic switch being able to generate the electronic signal independently of the absorption of the external force by the constant force spring element; and wherein the constant force spring element includes at least one compressible loop member having a first portion attached to the outer surface of the mobile element and a second portion, opposite the first portion, coupled to the electronic switch.

11. The bumper device of claim 10, wherein the constant force spring element includes:

a first length of elastic material having a first surface and a second surface;

a second length of elastic material having a first surface and a second surface;

a first end portion of the first surface of the first length of elastic material being coupled to the outer surface of the mobile element, a second end portion of the first surface of the first length of elastic material being coupled to the electronic switch; and the second length of elastic material being positioned opposite to the first length of elastic material with a first end portion of the first surface of the second length of elastic material being coupled to the outer surface of the mobile element and a second end of the first surface of the second length of elastic material being coupled to the electronic switch.

12. The bumper device of claim 10, wherein the at least one loop member is formed from a plastic material.

13. The bumper device of claim 10, further comprising:

a mounting assembly for mounting the electronic switch to the constant force spring element such that the constant force spring element is compressed when the external force is exerted against the electronic switch.

14. The device of claim 13, wherein the mounting assembly includes a plastic member having a plurality of apertures therethrough for mounting the electronic switch to a first surface thereof and for mounting the constant force spring element to a second surface thereof, whereby the plastic member reduces overall weight of the bumper device.

15. The bumper device of claim 14, wherein the mounting assembly further includes:

a vertical support member having a first end coupled to the second surface of the plastic member and a second end coupled to the outer surface of the mobile element at a height above the plastic member, whereby the vertical support member provides support for the bumper device in a vertical direction.

16. The bumper device of claim 10, further comprising:

a pair of end cap assemblies for sealing openings in opposite ends of the pressure sensitive electronic switch from liquid infiltration, each of the end cap assemblies including:

(a) an end cap member having a main portion and a protrusion extending therefrom, the protrusion being insertable within an opening in one of the ends of the pressure sensitive electronic switch, the end cap member having an aperture extending through the protrusion and the main portion; and (b) a pair of clamping members coupled to one another about opposite sides of the electronic switch corresponding to the location of the protrusion therein for sealing the end of the pressure sensitive electronic switch, whereby conductive leads extending from one of the ends of the pressure sensitive electronic switch extend through the aperture in the cap member for external access thereto.

wherein the electronic switch comprises a normally open pressure sensitive switch that closes in response to the application of the external force thereto and generates the electronic signal in response thereto, the pressure sensitive electronic switch including a plurality of conductive leads extending therefrom.

17. The bumper device of claim 16, wherein the pair of end cap assemblies further comprises:

a threaded plug member located within the aperture of a first cap member for sealing the aperture; and a hollow compression fitting member coupled to a sleeve member, the compression fitting member being secured within the aperture of a second end cap member with the leads of the pressure sensitive switch extending through the compression fitting member and the sleeve member.

18. The bumper device of claim 17, wherein the plug member and sleeve member are formed from a plastic material.

* * * * *